United States Patent [19]

Yamamoto

[11] 4,241,941
[45] Dec. 30, 1980

[54] PASSIVE SAFETY SEAT BELT SYSTEM

[75] Inventor: Kazuo Yamamoto, Sagamihara, Japan

[73] Assignee: NSK-Warner K.K., Tokyo, Japan

[21] Appl. No.: 21,916

[22] Filed: Mar. 19, 1979

[30] Foreign Application Priority Data

Mar. 23, 1978 [JP] Japan .................. 53-36109[U]
May 12, 1978 [JP] Japan .................. 53-62663[U]

[51] Int. Cl.³ .................................... B60R 21/10
[52] U.S. Cl. .................... 280/804; 297/468; 280/808
[58] Field of Search ............ 280/802, 803, 804, 807, 280/808; 297/468, 469, 474, 475

[56] References Cited

U.S. PATENT DOCUMENTS

| 3,583,726 | 6/1971 | Lindblad | 280/804 |
| 3,781,034 | 12/1973 | Botnick | 280/804 |
| 3,895,824 | 7/1975 | Bauer | 280/804 |
| 3,902,736 | 9/1975 | Bluggell | 280/804 |

Primary Examiner—John P. Silverstrim
Assistant Examiner—Randall A. Schrecengost
Attorney, Agent, or Firm—Shapiro and Shapiro

[57] ABSTRACT

A passive safety seat belt system having at least one member slidable in response to the opening-closing of a door of a vehicle is characterized by an elongated member having immovable one end lying at a suitable location on the body of the vehicle and the movable other end lying at a suitable location on the inside of the door and vice versa, and a link mechanism including lever mechanism pivotally supported on the inside of the door or the body. The lever mechanism serves to amplify and transmit the movement of the movable end of the elongated member to slide the slidable member.

8 Claims, 9 Drawing Figures

PASSIVE SAFETY SEAT BELT SYSTEM

BACKGROUND OF THE INVENTION

1. Field of the Invention

This invention relates to a safety seat belt system for vehicles. More particularly, it relates to a so-called passive safety seat belt system in which an anchor, a retractor of the like to which the end of the belt is attached, or a through member through which the belt passes is suitably moved in accordance with opening-closing of the door of a vehicle to automatically restrain and liberate the seat occupant.

2. Description of the Prior Art

Various safety seat belt systems of such type have been proposed. They use, however, a motor or the like as the drive means for moving an anchor or the like in response to opening-closing of the door, which leads to various problems regarding the necessity of securing a space for such drive means, ease of fabrication and manufacturing cost which are related to the number of parts, and power consumption and system maintenance.

SUMMARY OF THE INVENTION

It is therefore an object of the present invention to overcome these problems and to provide a passive safety seat belt system having a driving mechanism utilizing the force with which the door of a vehicle is opened and closed.

It is another object of the present invention to provide a passive safety seat belt system having a driving mechanism adapted to cause an anchor or the like to be moved over its entire stroke at the initial stage of the opening of the door of a vehicle.

The invention will become more fully apparent from the following detailed description thereof taken in conjunction with the accompanying drawings.

DESCRIPTION OF THE PREFERRED EMBODIMENTS

Figure 1:
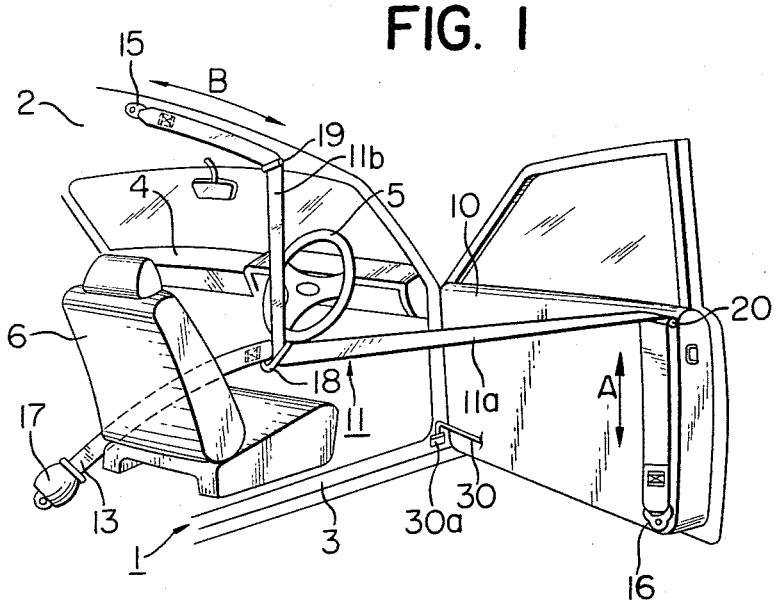
FIG. 1 is a pictorial perspective view of an embodiment of the present invention as applied to a driver's seat of a vehicle.

Embodiments of the present invention will hereinafter be described. In FIG. 1 which is a schematic pictorial perspective view showing the manner in which a first embodiment of the present invention is applied as a passive safety belt system of a driver's seat, 1 designates a vehicle body having a roof 2 and a bottom base frame 3. In the front of the compartment, there are an instrument board 4 and a steering wheel 5. A driver's seat 6 is attached to the floor of the body 1 and a door 10 is openably attached to the forward portion of the bottm base frame 3.

In the embodiment, a first webbing 11 having a waist belt part 11a and a shoulder belt part 11b has its upper end secured to the door side edge of the roof 2 by means of an anchor 15 and has its lower end secured to the lower portion of the inner openable side edge of the door 10 also by means of an anchor 16. However, one of these anchors may be replaced by a retractor.

On the other hand, there is provided a retractor 17 at the inner and rear side with respect to the seat 6 and a second webbing 13 extends out therefrom. The outer end of the second webbing 13 is secured to a loop 18 through which the first webbing 11 passes. By this loop 18, the first webbing 11 is turned back to form the aforementioned shoulder belt part 11b and waist belt part 11a. The waist belt part 11a is passed through a loop 20 as a runner vertically movable (in the direction of arrow A in FIG. 1) along the openable side edge of the door 10, and the shoulder belt part 11b is also passed through a loop 19 as a runner movable back and forth (in the direction of arrow B in FIG. 1) along the door side edge of the roof 2. The movements of these loops 19 and 20 are as follows. When the door 10 is opened, the loop 20 moves upwardly and the loop 19 moves forwardly. At this time, a suitable amount of the second webbing 13 is drawn from the retractor 17. This condition is shown in FIG. 1 and in this condition, the seat occupant can take the seat 6 and leave the seat 6 without any interference. When the door 10 is closed, the loop 20 now moves downwardly and the loop 19 moves backwardly to restrain the occupant on the seat 6. At this time, the second webbing 13 is wound up by the retractor 17. Such a safety seat belt system is an example of the passive type, but in the present invention, the manner of moving the members to be slid such as the loops, differs from that in the conventional seat belt system. The driving mechanism therefor will now be described.

Figure 2:
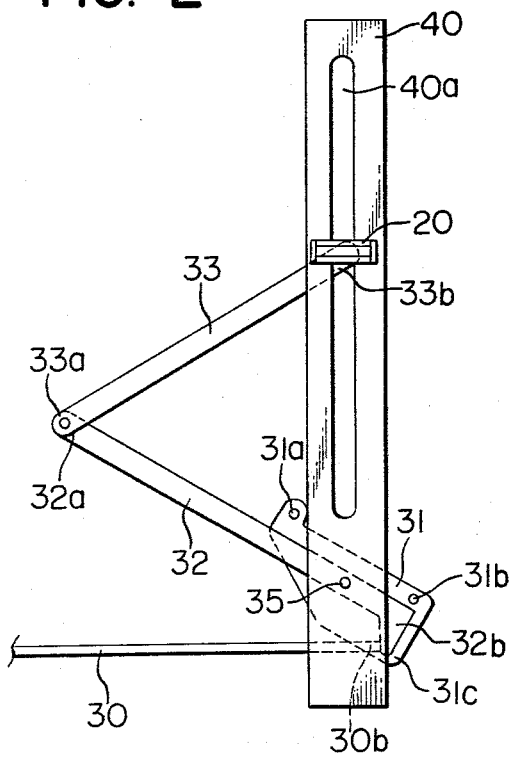
FIG. 2 is an enlarged front view of the link mechanism in the embodiment of FIG. 1.

An elongated member 30 is provided and it has one end 30a thereof immovably attached to a portion of the vehicle body 1 adjacent to the center of rotation of the door 10 and has the other end 30b thereof movable on the inside of the door 10. In FIG. 1, only one end 30a is seen and the other end 30b is hidden in the lining of the door 10. In FIG. 2 which shows the driving mechanism provided on the inside of the lining of the door 10, the other end 30b is connected to a portion 31c of a first rigid lever 31 pivotally attached onto the inside of the door. The material of the elongated member 30 may be any of a flexible material or a rigid material as long as it imparts a predetermined reciprocal angular movement to the first lever 31 in response to the opening-closing of the door 10. A second rigid lever 32 pivotally attached to the inside of the door by means of a pivot shaft 35 common to the first lever 31 has a longer arm portion and a shorter arm portion. At the outer end 32a of the longer arm portion, the second lever is pivotally connected to one end 33a of a rigid arm 33.

The other end 33b of the arm 33 is pivotally connected to the loop 20 slidable along a guide groove 40a vertically extending in a guide member 40.

Figure 3A:
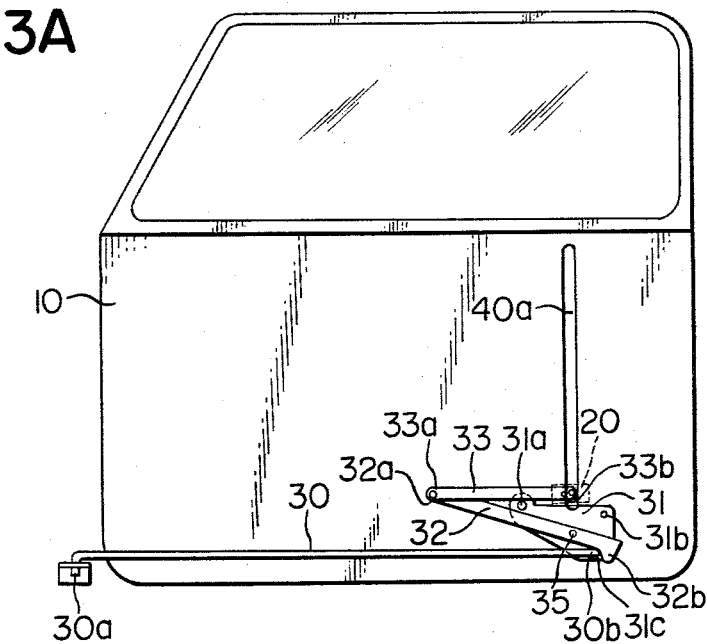
FIGS. 3A, 3B and 3C illustrate the operation of the link mechanism attached to the inside of the door in the embodiment of FIG. 1.
Figure 3B:
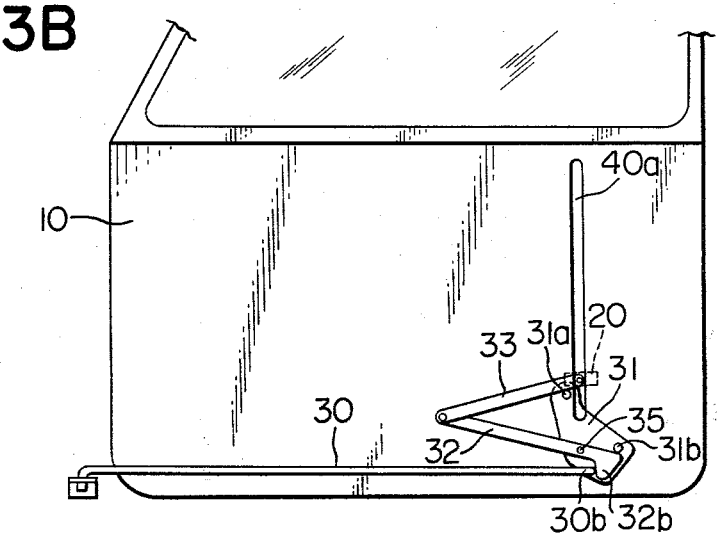
Figure 3C:
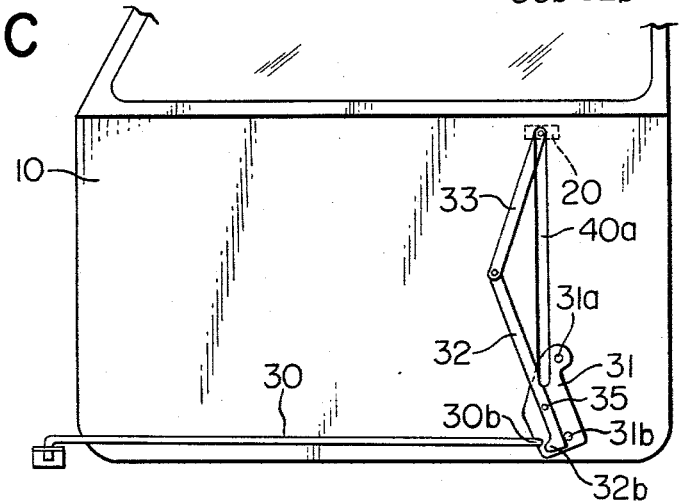

The first lever 31 has two pins 31a and 31b and in the position of FIG. 2, the movable end 30b of the elongated member 30 is engaged with the end 32b of the shorter arm portion of the second lever 32. The actions of these two pins 31a and 31b and the significance of this engagement will be described by reference to FIGS. 3A–3C while the action of this link mechanism is explained. In FIGS. 3A–3C, the guide member 40 itself is omitted and the guide groove 40a alone is shown, and the loop 20 is schematically indicated by broken lines.

FIG. 3A shows the position of the link mechanism when the door 10 has been closed. In this position, the movable end 30b of the elongated member 30 lies at a position near the openable side edge of the door 10. This will become apparent by supposing an imaginary plane perpendicular to the inside surface of the door containing the elongated member 30 and by considering the change in the figure formed by three lines, namely, the elongated member 30 having a substantially predetermined length, a straight line of a predetermined length extending between the center point of the door movement in the imaginary plane and the immovable end 30a of the elongated member 30, and a straight line extending between the center point of the door movement and the movable end 30b of the elongated member 30.

Now, with the movable end 30b at the above-described position, the first lever 31 is in a position wherein it has been rotated counterclockwise to an extreme position about the pivot shaft 35 and the second lever 32 is also in a position wherein the end 32b thereof has been pushed by the movable end 30b and the lever 32 has been rotated counterclockwise to an extreme position also about the pivot shaft 35. Accordingly, the direction-changing arm 33 is in its lower position wherein it is substantially parallel to the lower edge of the door 10, and the loop 20 is also in its lowermost position in the guide groove 40a.

Next, when the door 10 begins to be opened, the first lever 31 begins to be rotated clockwise by the movable end 30b. In the initial stage of this rotation, the pin 31a of the first lever 31 is engaged with the arm 33 to force it upwardly, which begins to slide the loop 20 upwardly while enlarging the angle formed between the arm 33 and the second lever 32. The pin 31a is at the left and upper portion of the first lever 31 so as to effect such action. The purpose of this is to avoid a phenomenon that even if an effort is made to raise the arm 33 by rotating the second lever 32 clockwise by means of the first lever 31 or by directly rotating the second lever 32, the arm 33 fails to be reliably raised because it is at its dead point.

As the door 10 is further opened, the force of the rotation of the first lever 31 begins to be transmitted to the second lever 32 by the pin 31b because the arm 33 has already left its dead point, thereby quickly raising the arm 33 to cause the loop 20 to slide to its uppermost position in the groove 40a (FIGS. 3B and 3C). The pin 31b is attached to the right and upper portion of the first lever 31 so as to effect such an action.

The case where the door 10 is closed will now be considered. When one tries to close the door 10, the movable end 30b tries to return to its aforementioned original position, thus rotating the end 32b of the second lever 32 engaged with this movable end 30b counterclockwise about the pivot shaft 35. By this, the movable end 30b is returned to its position of FIG. 3A when the door 10 is completely closed. The movable end 30b of the elongated member 30 and the end 32b of the second lever 32 effect such an action.

In the above-described first embodiment, the location occupied by the link mechanism is restricted to the lower portion of the door 10 and this leads to an advantage that the link mechanism does not impart any impediment to the lowering of the door window.

In the first embodiment, the direction-changing arm 33 is used to vertically move the loop 20 and further, along with that, the first lever 31 is used to release the arm 33 from its dead point, but in principle, the movable end 30b of the elongated member 30 may be directly engaged with the end 32b of the second lever 32 and members such as the loops to be slid may be slid in accordance with the amplified reciprocal angular movement of the end 32a of the second lever 32.

Also, in the first embodiment, the anchor may be moved or a retractor replacing the anchor may be moved. Particularly, if the retractor is moved with a suitable angle, there will be an advantage that unreasonable twist is not forcibly caused in the waist belt part 11a of the webbing 11.

Furthermore, in this embodiment, it will be possible to take as an output the movement of the movable end 30b or the amplified movement of the end 32a of the second lever 32 by means of a flexible linear member such as a wire or the like and thereby move the loop 19 coupled to such linear member. In this case, the wire or the like may be trained up over the inside of the door and through a pipe extending from the center of rotation of the door to the lower portion of the bottom base frame 3 and further over the upper portion of the bottom base frame 3 so as to be taken up by a pulley or the like biased in the take-up direction. However, where the movement of the movable end 30b is taken as an output, it will be necessary to amplify such movement by the use of a link mechanism provided at a suitable location.

Further, the positional relation between the movable end and the immovable end of the elongated member may be reversed.

Figure 4:
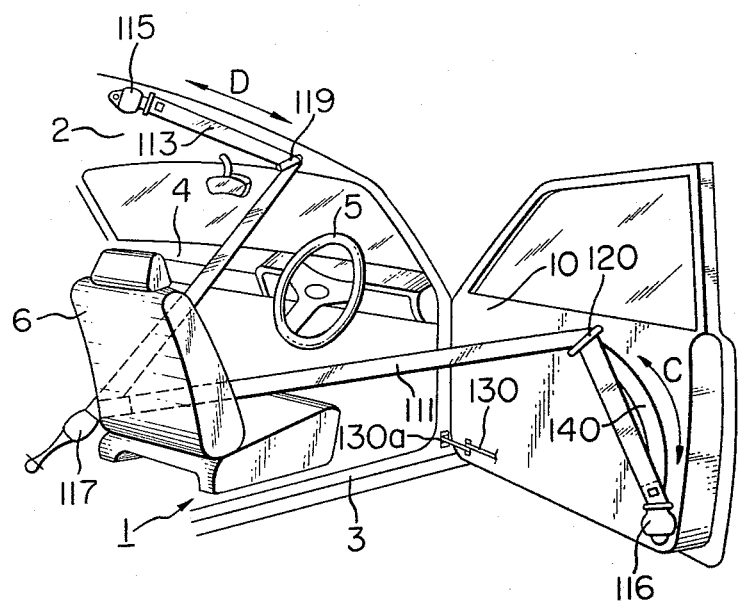
FIG. 4 is a pictorial perspective view of another embodiment of the present invention as applied to the driver's seat.

Next, a second embodiment of the present invention will be described. FIG. 4 is a schematic, pictorial, perspective view showing the state in which a second embodiment of the present invention is applied as a safety seat belt system for a driver's seat. Designated by 1 is a vehicle body having a roof 2 and a bottom base frame 3. There are an instrument board 4 and a steering wheel 5 in the front of the compartment. A driver's seat 6 is mounted on the floor of the body 1 and a door 10 is openably mounted on the forward portion of the bottom base frame 3.

In this embodiment, a waist belt 111 has one end thereof secured to the inner side of the seat 6 by means of an anchor 117 and the other end thereof secured to the lower portion of the inner openable side edge of the door 10 by means of a retractor 116. On the other hand, a shoulder belt 113 has one end thereof secured also to the inner side of the seat 6 by means of the anchor 117 and the other end thereof secured to the side edge of the roof 2 adjacent to the door by means of a retractor 115. The waist belt passes through a loop 120 as a runner movable along a groove 140 from the central upper edge of the door 10 to the lower portion of the openable side edge of the door, and the shoulder belt 113 also passes through a loop 119 as a runner movable back and fourth along the side edge of the roof 2 adjacent to the door. The movements of these loops are as follows. When the door 10 is opened, the through member 120 runs upwardly in response thereto and the loop 119 runs forwardly. Such a state is shown in FIG. 4 and in such state, the occupant can get on and off the seat 6 without being interfered with in any way. Next, when the door 10 is closed, the loop 120 now runs downwardly while the loop 119 runs backwardly, thereby restraining the occupant. This is an example of a passive type safety seat belt system and the present invention has a feature in the manner of moving sliding members such as the above-described loops. The driving mechanism for the sliding members will now be described.

A first rod 130 has one end thereof journalled to a mounting member 130a provided at a portion of the body 1 which is adjacent to the rotational axis of the door and the other end 130b secured to a slider 131. In FIG. 4, only one end of the rod 130 is seen and therefore, reference should be had to FIGS. 5(a)–5(c) which show the inside of the lining of the door 10. The slider 131 is slidable on a guide rail 132 secured to the inside of the door 10. The slider 131 is formed with a guide groove comprising a straight groove portion 131b extending in the direction of sliding and a branch groove portion 131a crooked adjacent to the side to which the other end 130b of the first rod 130 is secured.

The guide rail 132 is formed with a second guide groove comprising a second straight groove portion 132b passing through the end of the branch groove portion 131a and extending parallel to the straight groove portion 131b and a second branch groove portion 132a crooked from the second straight groove portion 132b toward the straight groove portion 131b of the slider 131. One end 133a of a second rod 133 is fitted into these two guide grooves and the other end 133b thereof is attached to a lever 134. This lever 134 is pivotally mounted to the inside of the door at a pivot 134a and one end 134b of the lever 134 is pivotally secured to the loop 120 slidable in an arcuate groove 140 whose center is located at the pivot 134a. Here, the length between the pivot 134a and the other end 133b of the rod 133 is set to a shorter value than the length between the pivot 134a and the end 134b and the position of the pivot 134a is deviated from the extension of the sliding path of the slider 131.

Figure 5A:
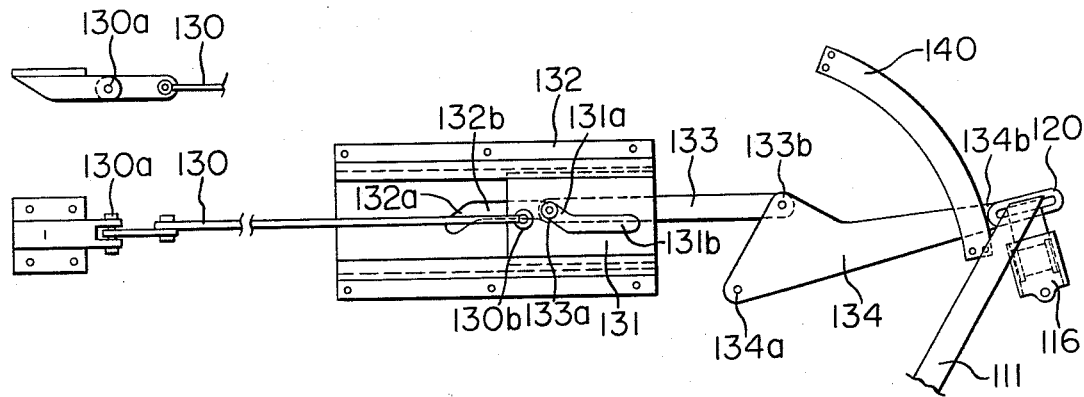
FIGS. 5(a), 5(b) and 5(c) illustrate the operation of the driving means mounted to the inside of the door in the embodiment of FIG. 4.
Figure 5B:
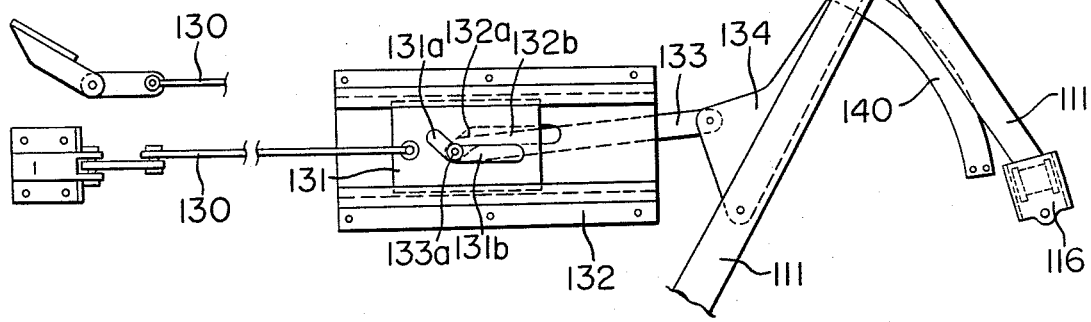
Figure 5C:
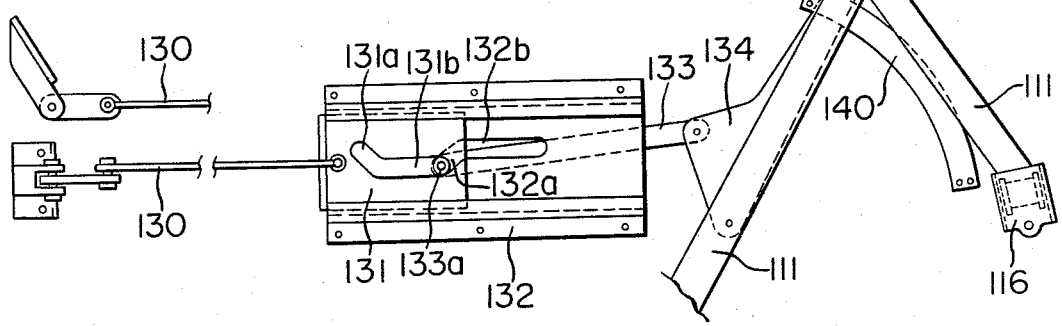

Reference is now had to FIGS. 5(a) to 5(c) to describe the operation of the second embodiment constructed as described above.

First, the position in which the door is closed is shown in FIG. 5(a). In this position, the slider 131 has slid to its rightmost position and thereby the lever 134 has been brought to its most clockwise rotated position with the loop 120 being at its lowermost end position in the groove 140.

When the door 10 begins to be opened, the slider 131 is leftwardly slid by the first rod 130 and accordingly, one end 133a of the second rod 133 engaged with the branch groove portion 131a slides in the second straight groove portion 132b while moving together with the slider 131. When the slider 131 has slid to the position of FIG. 5(b), one end 133a of the second rod 133 enters into the second branch groove portion 132a and at the same time slides down from the branch groove portion 131a to the end of the straight groove portion 131b of the slider 131. Accordingly, thereafter, even if the door 10 is further opened to cause the slider 131 to slide leftwardly, one end 133a of the second rod 133 slides only in the straight groove portion 131b and does not move with the slider 131 (see FIGS. 5(b) and 5(c). These movements are reversible and therefore, the movements occurring when the door 10 is closed will be apparent.

Thus, by making such a design that the position of FIG. 5(b) occurs when the door 10 is opened through 30° to 45° and that by that point of time the loop 120 has been slid to the uppermost end of the groove 140 by the lever 134 which is pivoted counterclockwise by the second rod 133, a safety seat belt which permits ready egress and ingress of the occupant with respect to the vehicle may be realized by the second embodiment.

The modification and alteration as described in the explanation of the first embodiment are also possible in the second embodiment.

What is important as the concept of the second embodiment consists in making such a design that both the slider 131 and one end 133a of the second rod 133 are movable in response to the opening-closing of the door between its fully closed position and its half-open position, but that the slider 131 is movable while the one end 133a is stationary and only slidable in the straight groove portion 131b in response to the opening-closing of the door between its half-open position and its fully opened position. Therefore, for example, it is also possible to eliminate the second guide groove in the guide rail 132 and instead, provide such a member as a camming surface which will contact the one end 133a so that the one end 133a may be forced out into the straight groove portion 131b from the branch groove portion 131a near the position of FIG. 5(b). It is also conceivable to eliminate even the branch groove portion 131a and to provide a member projected so as to retain the one end 133a against sliding in the straight groove portion 131b from the position of FIG. 5(a) to the position of FIG. 5(b) and retractable near the position of FIG. 5(c). It is essential that change-over means is necessary to cause the one end 133a to effect the above-described movement and various means would be conceivable from the known art such as cam mechanism or the like.

What I claim:

1. A passive safety seat belt system comprising:
   at least one slide member being slidable in response to opening-closing of a vehicle door to change a condition of a belt engaged therewith in order to automatically restrain and liberate an occupant of a seat;
   an elongated member having one end lying at a vehicle body part adjacent said door and the other end lying at a part of said door, one of said two ends being immovably attached and the other end being movable;
   and link mechanism for amplifying and transmitting the motion of said movable end of said elongated member including
   a first pivotally mounted lever,
   a second pivotally mounted lever,
   and a direction-changing arm, said first lever having a portion engaged with the movable end of said elongated member, a portion engageable with said direction-changing arm in an initial stage of the opening of said door, and a portion engageable with one end of said second lever during a stage subsequent to said initial stage of the opening of said door, and the other end of said second lever being pivotally connected to one end of said direction-changing arm, the other end of said direction-changing arm being pivotally connected to said slide member, the length between a center of pivotal rotation of said second lever and said other end of said second lever being greater than that between said center and said one end of said second lever.

2. A seat belt system according to claim 1, wherein the movable end of said elongated member is engaged with said one end of said second lever when said door closes.

3. A seat belt system according to claim 1, wherein a center of pivotal rotation of said first lever is common to that of said second lever.

4. A passive safety seat belt system, comprising:
at least one slide member being slidable in response to opening-closing of a vehicle door to change a condition of a belt engaged therewith in order to automatically restrain and liberate an occupant of a seat;
a first elongated member having one end lying at a vehicle body part adjacent said door and the other end lying at a part of said door, one of said two ends being immovably attached and the other end being movable;
a link mechanism including lever means pivotally supported for amplifying and transmitting a motion of said movable end of said elongated member to said slide member;
and intermediate means for transmitting the motion of the movable end of said first elongated member to said lever means during the opening-closing of said door between its fully closed position and its half opened position and for stopping the transmission of the motion of said movable end to said lever means during the opening-closing of said door between its half opened position and its fully opened position, whereby said slide member may be slid over its entire stroke during the opening-closing of said door between its fully closed position and its half opened position.

5. A seat belt system according to claim 4, wherein said intermediate means includes a slider formed with a first guide groove having a first portion and a second portion extending substantially in the direction of sliding movement of said slider, said movable end being secured to said slider, a guide rail for sliding said slider thereon, a second elongated member having one end fitted in said first guide groove, change-over means for holding said one end of said second elongated member in said first portion of said first guide groove when said slider is slid by said first elongated member during the opening-closing of said door between its fully closed position and its half opened position and for permitting said one end of said second elongated member to move from said first portion when said door is further opened from its half opened position so that said one end may slide in said second portion of said first guide groove when said slider is slid by said first elongated member during the opening-closing of said door between its half opened position and its fully opened position.

6. A seat belt system according to claim 5, wherein the first portion of said first guide groove is a first branch groove portion formed at an angle with respect to said second portion, and said change-over means includes said first branch groove portion, and a second guide groove formed in said guide rail, said second guide groove comprising a straight groove portion extending so as to pass through the end of said first branch groove portion and extending substantially parallel to said second portion of said first guide groove and a second branch groove portion crooked from said straight groove portion toward said second portion of said first guide groove so as to intersect said first branch groove portion when said slider is in its slid position corresponding to said half opened position of said door, said one end of said second elongated member being also fitted in said second guide groove.

7. A passive safety seat belt system for a vehicle having a body and a door, said system having a belt and being operable during opening-closing of said door, comprising:
an arm movable to change the position of said belt;
a member having a portion movable in response to opening-closing of said door;
first lever means coupled to said member and effective to move said arm only during a first portion of the opening-closing of the door; and
second lever means coupled to said member and effective to move said arm during a second portion of the opening-closing of the door.

8. A passive safety seat belt system for a vehicle having a body and a door, said system having a belt and being operable during opening-closing of said door, comprising:
an element movable to change the position of said belt;
a member having a portion movable in response to opening-closing of said door; and
a mechanism for coupling said portion of said member to said element to move said element during the opening-closing of said door between its fully closed position and a partially open position and for decoupling said element from said portion of said member during the opening-closing of said door between its partially open position and its fully open position, whereby said element may be moved over an entire stroke during the opening-closing of said door between its fully closed position and its partially open position.

* * * * *